(12) United States Patent
Petculescu et al.

(10) Patent No.: US 7,590,638 B2
(45) Date of Patent: Sep. 15, 2009

(54) SYSTEM AND METHOD FOR ONLINE ANALYTICAL PROCESSING USING DIMENSION ATTRIBUTES AND MULTIPLE HIERARCHIES WHERE FIRST HIERARCHY HAS AT LEAST ONE ATTRIBUTE FROM THE DEFINED DIMENSION NOT PRESENT IN THE SECOND HIERARCHY

(75) Inventors: Cristian Petculescu, Redmond, WA (US); Amir Netz, Bellevue, WA (US); Mosha Pasumansky, Redmond, WA (US); Marius Dumitru, Redmond, WA (US); Alexander Berger, Sammamish, WA (US); Paul Jonathon Sanders, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

(21) Appl. No.: 10/603,037

(22) Filed: Jun. 24, 2003

(65) Prior Publication Data

US 2004/0267799 A1  Dec. 30, 2004

(51) Int. Cl.
*G06F 17/00* (2006.01)
*G06F 17/30* (2006.01)
(52) U.S. Cl. .................... 707/100; 707/1; 707/102; 707/200
(58) Field of Classification Search ............. 707/1–3, 707/100, 102, 103 R–103 Y, 200
See application file for complete search history.

(56) References Cited

U.S. PATENT DOCUMENTS

| | | | | |
|---|---|---|---|---|
| 5,918,232 | A * | 6/1999 | Pouschine et al. | 707/103 R |
| 5,940,818 | A | 8/1999 | Malloy et al. | 707/2 |
| 6,205,447 | B1 | 3/2001 | Malloy | 707/102 |
| 6,473,764 | B1 * | 10/2002 | Petculescu et al. | 707/102 |
| 6,477,536 | B1 | 11/2002 | Pasumansky et al. | 707/102 |
| 6,535,872 | B1 * | 3/2003 | Castelli et al. | 707/3 |
| 6,542,892 | B1 * | 4/2003 | Cantwell | 707/10 |

(Continued)

FOREIGN PATENT DOCUMENTS

EP  1025514  * 12/2001

(Continued)

OTHER PUBLICATIONS

Colossi et al. (Relational extensions for OLAP, IBM Systems Journal, vol. 41, No. 4, 2002, pp. 714-731, Accepted for publication Aug. 19, 2002).*

(Continued)

*Primary Examiner*—Srirama Channavajjala
(74) *Attorney, Agent, or Firm*—Woodcock Washburn LLP

(57) ABSTRACT

A data model for accessing data in a relational database in an OLAP system utilizes a multiple-hierarchy dimension. The dimension includes a set of attributes. Each attribute is bound to a column in the relational database. A logical structure is defined, indicating the relationships between the attributes. Hierarchies are defined. Each hierarchy includes a sequence of attributes. A hierarchy provides a common drill-down path that a database user can utilize to access the database. A hierarchy can include a single attribute or a combination of attributes. Both the relationships between the attributes and the sequence of attributes in a hierarchy are defined independent of any restrictions associated with the database.

31 Claims, 6 Drawing Sheets

U.S. PATENT DOCUMENTS

| | | | |
|---|---|---|---|
| 6,658,413 B1* | 12/2003 | Reddy et al. | 707/8 |
| 6,985,906 B2* | 1/2006 | Yamashita | 707/102 |
| 7,133,856 B2* | 11/2006 | Huang et al. | 706/21 |
| 2003/0145004 A1* | 7/2003 | Egilsson et al. | 707/6 |
| 2004/0103092 A1* | 5/2004 | Tuzhilin et al. | 707/3 |
| 2004/0122844 A1* | 6/2004 | Malloy et al. | 707/102 |

FOREIGN PATENT DOCUMENTS

| | | | |
|---|---|---|---|
| EP | 1101172 | * | 8/2003 |

OTHER PUBLICATIONS

Mark s, A visual interface technique for exploring OLAP data with coordinated dimension hierarchies, Conference on Information and Knowledge Management Proceedings of the twelfth international conference on Information and knowledge management, 2003, pp. 532-535.*

Gayatri Sathe et al. "Intelligent Rollups in Multidimensional OLAP Data", Proceedings of the 27th VLDB Conference,, 2001, 10 pages.*

Anna Rozeva, "Dimensional Hierarchies—Implementation in Data Warehouse Logical Scheme Design",International Conference on Computer Systems and Technologies—CompSysTech'07, 6 pages.*

Volker Markl et al. "Improving OLAP Performance by Multidimensional Hierarchical Clustering", IEEE 1999, 13 pages.*

Torben Bach Pedersen et al, "Multidimensional Data Modeling for Complex Data", IEEE 1999, 10 pages.*

H V Jagadish et al. "What can Hierarchies do for Data Warehouse?" Proceedings of the 25th VLDB Conference Edinburgh Scotland, 1999, 12 pages.*

*Data Mining Dimensions*, Micorsoft ©, Release : Yukon 9.0, Feb. 6, 2003, 44 pages.

*Picasso DDL and MetaData Specification*, Microsoft ©, Release: Yukon 9.0, Feb. 4, 2003, 218 pages.

Trakulsuk, P. et al., "Designing a Logical Data Model from a Warehouse Database", Oct. 6-8, 1999, 66-71.

Wang, X.S. et al., "Deriving Orthogonality to Optimize the Search for Summary Data", *Information Systems*, 1999, 24(1), 47-65.

Kirkgöze, et al., "A Security Concept for OLAP", *Proceedings of the Eight International Workshop, IEEE Computer*, 1997, 619-626, XP 010243354.

Moran, B., "Mastering OLAP: Member Properties", *SQL Server Magazine*, Aug. 1999, www.winnwtmag.net/articles/Print.cfm?ArticleID=5666, 4 pages, XP-002311007.

Moran, B., "Mastering OLAP: Multiple Hierarchies per Dimension", *SQL Server Magazine*, Sep. 1999, www.windositpro.com/Articles/Print.cfm?ArticleID=5916, 6 pages, XP-002311008.

* cited by examiner

SYSTEM AND METHOD FOR ONLINE ANALYTICAL PROCESSING USING DIMENSION ATTRIBUTES AND MULTIPLE HIERARCHIES WHERE FIRST HIERARCHY HAS AT LEAST ONE ATTRIBUTE FROM THE DEFINED DIMENSION NOT PRESENT IN THE SECOND HIERARCHY

FIELD OF THE INVENTION

The present invention pertains generally to computer-implemented databases, and more specifically to a data model for accessing online analytical processing databases.

BACKGROUND OF THE INVENTION

Typical relational database management system (RDBMS) products have limitations with respect to providing users with specific views of data. Thus, front-ends have been developed for RDBMS products so that data retrieved from the RDBMS can be aggregated, summarized, consolidated, summed, viewed, and analyzed. This type of functionality is known as on-line analytical processing (OLAP).

OLAP is a key part of most data warehouse and business analysis systems. OLAP services provide for fast analysis of multidimensional information. OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner.

Data in an OLAP system can be characterized in terms of its complexity, that is, the number of dimensions used to index the data. Thus, a complex data set is one that has many dimensions. Complex data sets have the advantage of flexibility in that users can submit more queries to complex data sets than to simple data sets. Accordingly, it is often desirable to use complex data sets. However, it is difficult to handle a large number of dimensions using conventional OLAP systems. Thus an improved mechanism for accessing a database in an OLAP system is desired.

SUMMARY OF THE INVENTION

In one embodiment of the present invention, a multiple-hierarchy dimension is used to access a relational database in an OLAP system. The dimension includes a set of attributes. Each attribute is bound to a column in the relational database. Relationships between the attributes are defined. These relationships are defined independent of any restrictions associated with the database. The attributes and their relationships define the dimension and its constraints. Hierarchies are defined to be used as a drill down paths to access the database. Each hierarchy includes a sequence of attributes. A hierarchy can include a single attribute or a combination of attributes. The hierarchies are defined independent of any restrictions associated with the database.

A method for accessing a database via a multiple-hierarchy dimension includes defining a dimension having a plurality of attributes. Each attribute is assigned, or bound, to a respective column of the database. The relationships between the attributes are defined, and the database is accessed via the multiple-hierarchy dimension.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

A technique for accessing data in a relational database in accordance with an embodiment of the present invention allows arbitrary relationships to be defined between items in the database. These arbitrary relationships can be used to drill down into the database quickly and efficiently. In one embodiment, this technique is implemented within an OLAP system. The technique includes a multiple-hierarchy dimension having a plurality of attributes. Each attribute is assigned (e.g., bound) to a column in the relational database. Relationships between the attributes are defined. The logical structure of these relationships and the attributes themselves identify the details and constraints of each dimension. Hierarchies are defined to facilitate drill down paths into the relational database. A hierarchy includes a sequence of attributes. A hierarchy can comprise any sequence of attributes and/or levels within an attribute. No restrictions are imposed on the formation of a sequence. Thus, a hierarchy may comprise all attributes, one attribute, or aggregates of attributes.

Overview of a Suitable Computing System Environment

Figure 1:
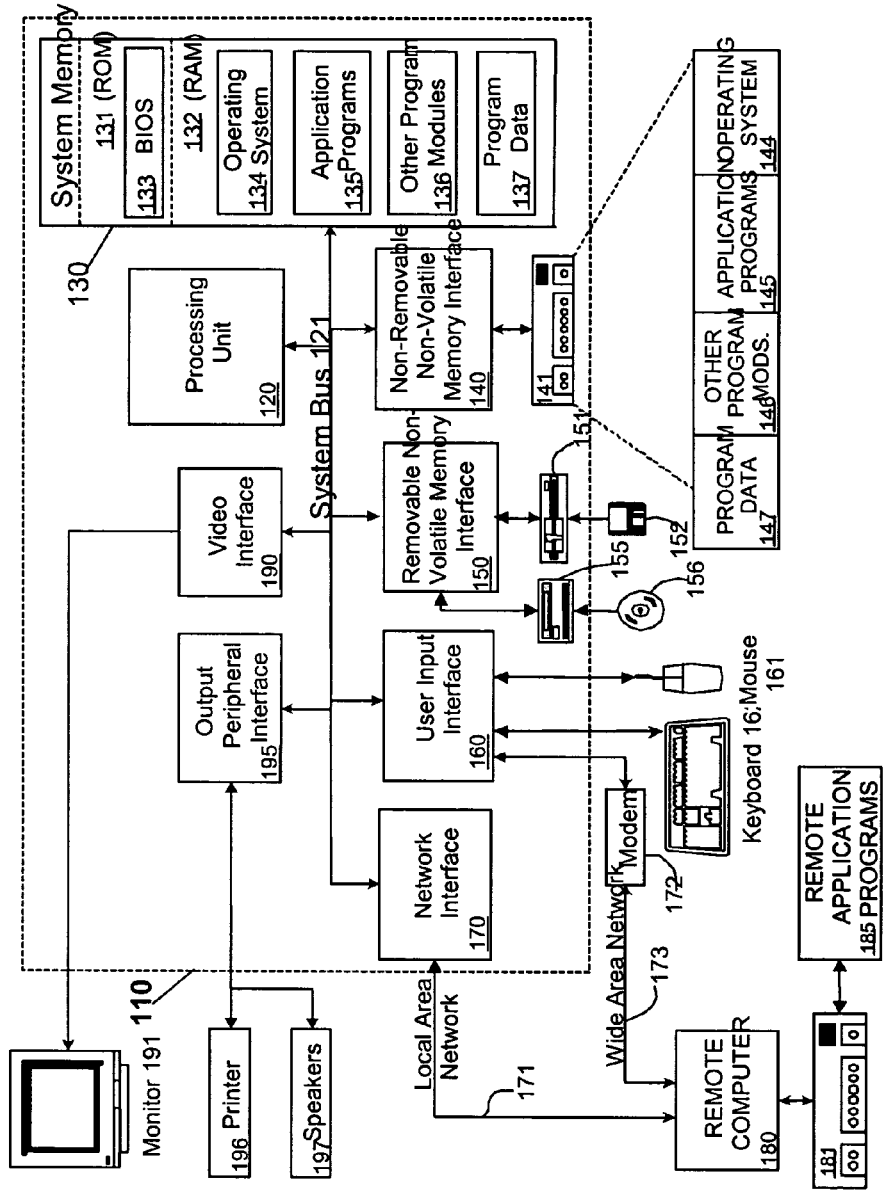
FIG. 1 illustrates an example of a suitable computing system environment in which the method and system for multiple-hierarchy dimensions in accordance with an exemplary embodiment of the present invention may be implemented.

FIG. 1 illustrates an example of a suitable computing system environment 100 in which the system and method for OLAP using dimension attributes and multiple hierarchies per dimension may be implemented. The computing system environment 100 is only one example of a suitable computing environment and is not intended to suggest any limitation as to the scope of use or functionality of the method and system for accessing data in a relational database. Neither should the computing environment 100 be interpreted as having any dependency or requirement relating to any one or combination of components illustrated in the exemplary operating environment 100.

The OLAP systems and methods of the invention using dimension attributes and multiple hierarchies per dimension are operational with numerous other general purpose or special purpose computing system environments or configurations. Examples of well known computing systems, environments, and/or configurations that may be suitable for use with the method and system for accessing data in a relational database include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The OLAP systems and methods using dimension attributes and multiple hierarchies per dimension may be described in the general context of computer-executable instructions, such as program modules, being executed by a computer. Generally, program modules include routines, programs, objects, components, data structures, etc. that perform particular tasks or implement particular abstract data types. The OLAP systems and methods using dimension attributes and multiple hierarchies per dimension may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the OLAP systems and methods of the invention using dimension attributes and multiple hierarchies per dimension includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the OLAP systems and methods using dimension attributes and multiple hierarchies per dimension in accordance with the invention may also be implemented via an operating system, application program interface (API), or a "middle man" object between a coprocessor and requesting object, such that services may be performed by, supported in, or accessed via all of .NET's languages and services, and in other distributed computing frameworks as well.

Description of Exemplary Embodiments

Figure 2:
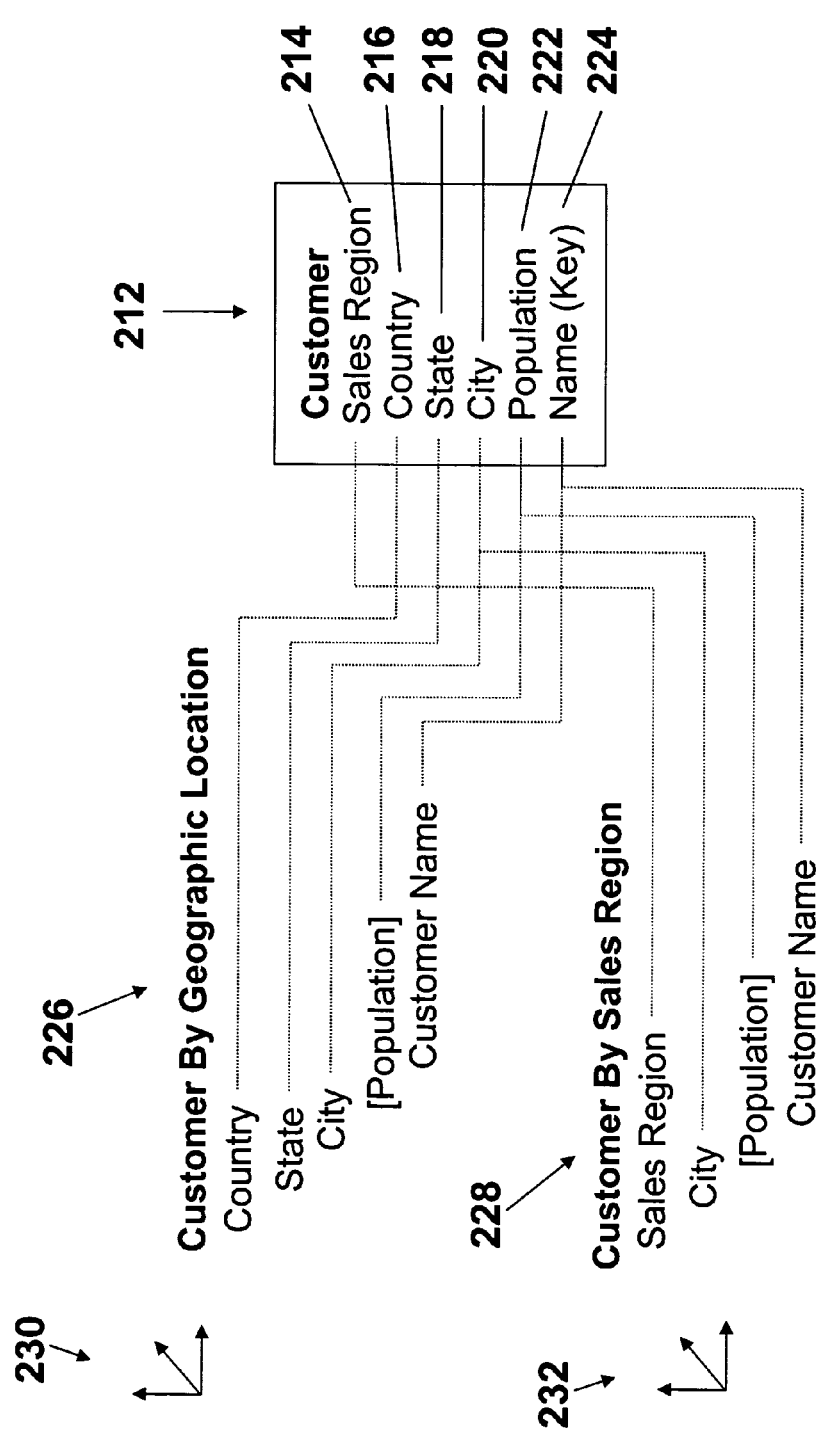
FIG. 2 is an illustration of exemplary dimensions associated with contents of a database.

FIG. 2 is an illustration of exemplary dimensions 226 and 228, associated with contents of a database 212. The database 212 is a relational database comprising six columns. Column 214 contains data items pertaining to sales region, column 216 contains data items pertaining to country, column 218 data items pertaining to state, column 220 contains data items pertaining to city, column 222 contains data items pertaining to population, and column 224 contains data items pertaining to customer name. A dimension represents a specific perspective of the contents of a database. Multiple dimensions may be defined for a given database. Typically, a hierarchy is associated with a dimension. For example, a time dimension can consist of days, weeks, months, and years, or a geography dimension can consist of cities, states/provinces, and countries. Dimension members act as indices for identifying a particular data item or range of data items within a database. Typically, a database user, such as business, designs a dimension to capture information pertinent to the business. Two such logical dimensions are illustrated as dimensions 226 and 228. Dimension 226 organizes customers by geographic location and dimension 228 organizes customers by sales region. The dimension 226 comprises members 'country', 'state', 'city', and 'customer name'. The dimension 226 also contains a member property, 'population', which is a property of the member 'city'. The dimension 228 comprises members 'sales region', 'city', and 'customer name'. The dimension 228 also contains a member property, 'population', which is a property of the member 'city'. The linear structure in dimension 226 organizes customers in cities, cities in a state, and states in countries. The linear structure in dimension 228 organizes customers in cites and cities in sales region. A sales region may contain cities from more than one country and a country may be split into more than one sales region. In both dimensions, cities have a population. The depiction of orthogonal axes 230 and 232 indicate that the dimension 226 and the dimension 228 may each be contained in a cube. With respect to databases, cubes are well known in the art. A cube is a fundamental entity that is typically used in OLAP databases.

One way to associate the dimensions, 226, 228, with the database 212 is to bind each of the attributes of each of the dimensions, 226, 228, to the columns of the database 212. Each value of an attribute is a member As illustrated by the dotted lines in FIG. 2, the member 'country' of dimension 226 could be bound to the column 'country' 216 of the database 212, the member 'state' of dimension 226 could be bound to the column 'state' 218 of the database 212, the member 'city' of dimension 226 could be bound to the column 'city' 220 of the database 212, and the member 'customer name' of dimension 226 could be bound to the column 'customer name' 224 of the database 212. The same could be done for the dimension 228. That is, the member 'sales region' of dimension 226 could be bound to the column 'sales region' 214 of the database 212, the member 'city' of dimension 226 could be bound to the column 'city' 220 of the database 212, and the member 'customer name' of dimension 226 could be bound to the column 'customer name' 224 of the database 212.

The structures of the dimensions 226 and 228 provide a linear hierarchy by which a database user can search (drill down) the database for a particular data item. For example, if a database user is searching for the name of a particular customer, the dimension 228 would be utilized to drill down through the sales region, city, and customer name. If the database user also wants to know the country of the same customer, the dimension 226 would be utilized to drill down to the country. Note that two separate dimensions are defined, corresponding to the two different hierarchies of customer.

This technique of using a linear hierarchy for each dimension incorporates much repetition. The dimension levels containing members 'customer name', 'city', and the member property 'population', exist in both hierarchies of dimensions 226 and 228. This requires repetition of the bindings of the members of each dimension to the columns of the database, repetition of their data types, repetition of their names, and repetition of any auxiliary information (e.g., meta data, formulas). Also, duplicate storage of data is required. This results in the need to retrieve the same details multiple times from the relational database 212. Furthermore, a database user is limited to querying only the hierarchies (e.g., in dimensions 226 and 228) defined by the cube designer. Thus, a database user could not request to see details by country, broken down by the sales regions covering that country. It becomes impracticable for the designer of the cube to define hierarchies covering every possible drill-down path that the database user might want. Also, note that if a database user were to request country and sales region, all combinations of country and sales region would be returned, even if no customers existed for any given combination. Different mechanisms are used to retrieve data pertaining to separate levels and member properties, which results in duplication of circuitry and increased processing load on the database system.

Figure 3:
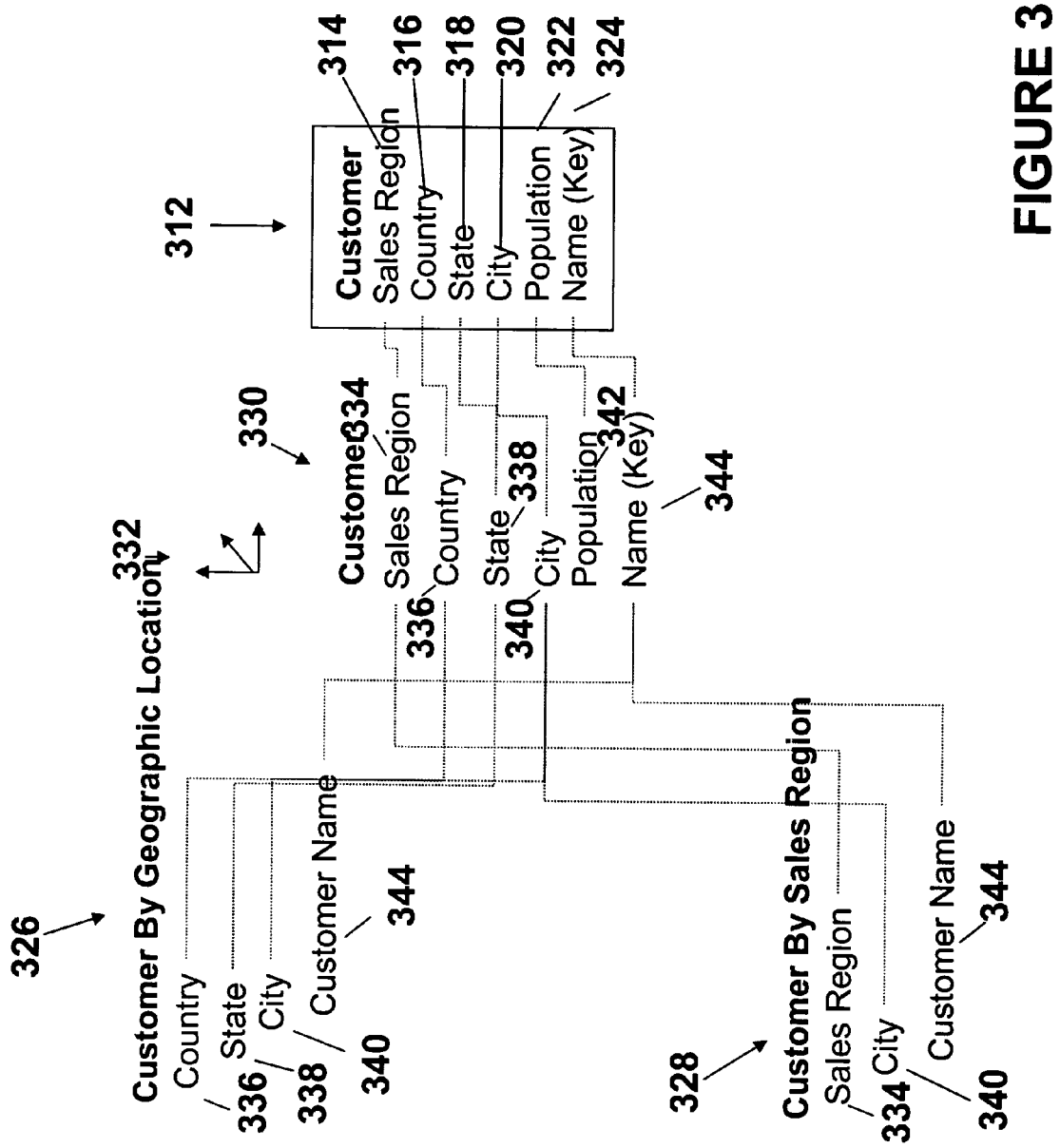
FIG. 3 is an illustration of a multiple-hierarchy dimension in accordance with an exemplary embodiment of the present invention.

FIG. 3 is an illustration of a multiple-hierarchy dimension 330 utilized to access data in database 312, in accordance with an exemplary embodiment of the present invention. The multiple-hierarchy dimension 330 comprises attributes that coincide with the columns of the database 312. Each of the attributes of the dimension 330 is bound to a column in the relational database 312. The database 312 is accessed via the dimension 330. As shown by the dotted lines in FIG. 3, the attribute 'customer name' 344 is bound to the column 'name' 324, the attribute 'population' 342 is bound to the column 'population' 322, the attribute 'city' 340 is bound to the column 'city' 320, the attribute 'state' 338 is bound to the column 'state' 318, the attribute 'country' 336 is bound to the column 'country' 316, and the attribute 'sales region' 334 is bound to the column sales region' 314. The dimension 330 may be implemented as a cube, as indicated by the orthogonal axes 332.

The relationships between the attributes of the dimension 330 are definable. Example definitions may include: a customer is in one city, every city is in one state, each city is assigned to one sales region, and each city has a population. A multiple-hierarchy dimension (e.g., dimension 330) and its constraints are defined by the dimension's attributes and the relationships therebetween. In one embodiment, the relationships between the attributes are defined by the designer of the cube. There are no restriction placed on these definitions, thus the cube designer may define the relationships between the attributes from a perspective of the database user's needs, and not be hindered by any database restrictions. The relationships between the attributes define the constraints that exist on the data. For example, a State can only exist in a single Country. The relationships can be defined irrespective of whether the underlying database structure enforces such constraints or not.

A multiple-hierarchy dimension can have multiple hierarchies associated therewith. As shown in FIG. 3, hierarchies 326 and 328 are associated with the dimension 330. Each hierarchy, 326 and 328, comprises a sequence of attributes that represent a drill-down path that a database user may utilize. The hierarchy 326 comprises the attributes country 336, state 338, city 340, and customer name 344. The hierarchy 328 comprises the attributes sales region 334, city 340, and customer name 344. Each hierarchy associated with a multiple-hierarchy dimension (e.g., dimension 330) is definable. In one embodiment, hierarchies are defined by the designer of the cube. There are no restriction placed on these definitions, thus the cube designer may define the hierarchies from a perspective of the database user's needs, and not be hindered by any database restrictions. For example, a hierarchy can be defined that provides a drill down path from sales region to country. A hierarchy can be defined comprising a single attribute. Furthermore, a hierarchy can be defined comprising a single attribute and an optional level for all members within that attribute. For example, a hierarchy can be defined comprising the attribute population 342 and a level containing members for every distinct value of the population column 322. This could be exposed to a database user as 'Populations'. This hierarchy would provide a drill down path to the population of all cities. Note, that the attribute Population would always have a level 'Population', containing a member for every distinct value of the population column. It can also optionally have a level 'All' containing a single member 'All Populations'. Queries involving more than one hierarchy (e.g., country and sales region) will return combinations for which there is at least one dimension member.

All of the columns of the database 312 can be exposed as different hierarchies utilizing the multiple-hierarchy dimension 330. Hierarchies can be created that comprise any combination of attributes. A database user can use these hierarchies to query the database with the same degree of flexibility as can be provided by directly querying the underling table of data within the database. Adding additional hierarchies to a multiple-hierarchy dimension (e.g., dimension 330) has relatively little impact on the storage requirements of the database system, because additional dimensions are not required. Each additional hierarchy utilizes the same multiple-hierarchy dimension. Also, aggregates can be defined in terms of attributes. An aggregate is a path that can essentially cut across hierarchies. For example, a designer can maintain an aggregate by city, regardless of the hierarchies defined. Also, the designer could define a hierarchy containing only the attribute 'city'.

Figure 4:
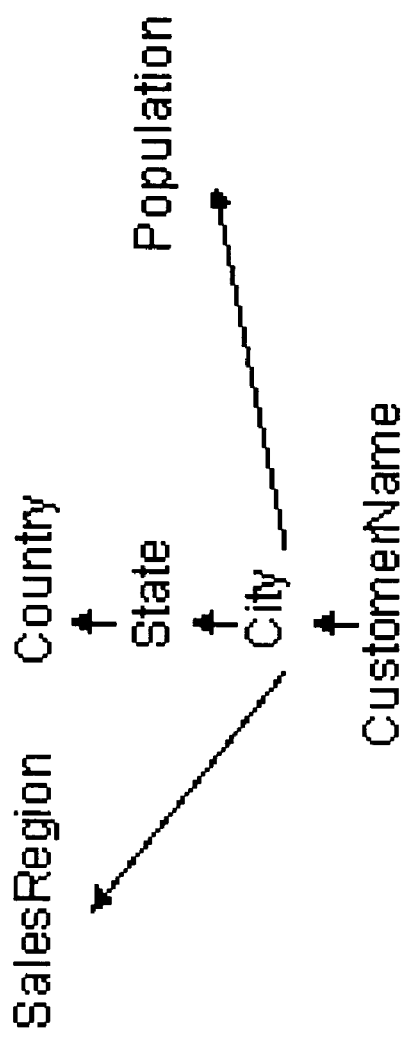
FIG. 4 is an illustration of an exemplary structure of relationships between attributes in accordance with an exemplary embodiment of the present invention.

FIG. 4 is an illustration of an exemplary structure of relationships between attributes. Relationships describe how the data is related, e.g., Cities in one State, etc. Hierarchies describe the drilldown paths, and may or may not follow the relationships. The examples described thus far have each followed the relationships, however this is not necessary. For example, a hierarchy can be defined from Region to Country. The structure of a hierarchy is a product of the relationships defined between attributes therein. The structure shown in FIG. 4 is not linear. Thus, starting at a key attribute, multiple drill down paths are available. Thus, one is not locked into a single drill down path starting from a key attribute. It is to be understood, that the structure depicted in FIG. 4 is exemplary. Any structure can be defined.

Database users can utilize different hierarchies in a query of the database, however, the results and the aggregates that are exploited to improve query performance, depend upon the 'coordinates' defined in terms of the members. For example, requesting the total sales of the city 'Seattle' will be the same regardless of whether the 'Customers By Country' or 'Customers By Sales Region' hierarchy is used. A cube designer can add additional hierarchies to ease the formulation of queries based upon the common hierarchies in which a database user views the data.

In addition to providing relative storage requirements improvements, utilization of a multiple-hierarchy dimension as described above provides processing performance improvements. The implementation of separate attributes provides performance improvements during processing, such that different attributes within a single dimension can be processed in parallel. Also, data pertaining to attributes can be validated during processing based on the relationships that are defined For example, if the attribute 'state' is related to the attribute 'country' an error can be reported if the same state appears in multiple countries. Note, validation is based on the relationships between attributes, not the hierarchies that are defined.

Figure 5:
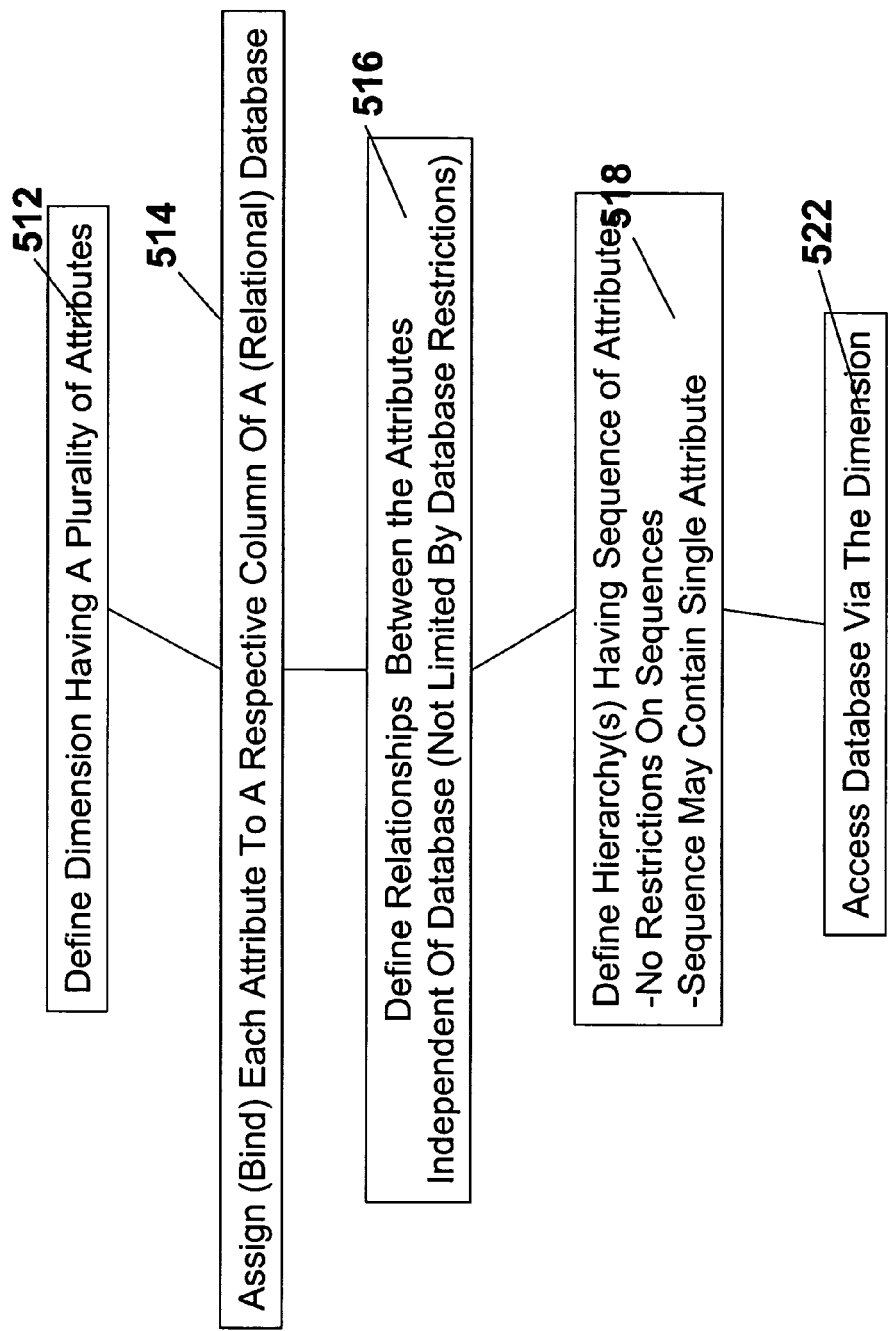
FIG. 5 is a flow diagram of an exemplary process for accessing a database in accordance with an embodiment of the present invention.

FIG. 5 is a flow diagram of an exemplary process for accessing a database in accordance with an embodiment of the present invention. A dimension (e.g., dimension 330) is defined having a plurality of attributes at step 512. At step 514, each attribute of the dimension is bound (assigned) to a respective column in the database (e.g., database 312). As described above, in one embodiment, the database is a relational database. Also, in an embodiment, the database system is an OLAP system. The relationships between attributes are defined at step 516. These relationships are defined independent of the database. That is, the relationships between the attributes of a dimension are not subject to restrictions placed on the database. The relationships can be arbitrarily defined, meaning that the any relationship is allowed. At step 518, at least one hierarchy is defined. Each hierarchy is a drill down path to access the database. A hierarchy may include any sequence of attributes. No restrictions are placed on the definition of a hierarchy. A hierarchy may contain a single attribute or any combination of attributes. The hierarchies are defined independent of the database. That is, the hierarchies are not subject to restrictions placed on the database. The database is accessed via the dimension at step 522. Accessing the database can include reading from the database, writing to the database, adding data to the data base, or a combination thereof.

Figure 6:
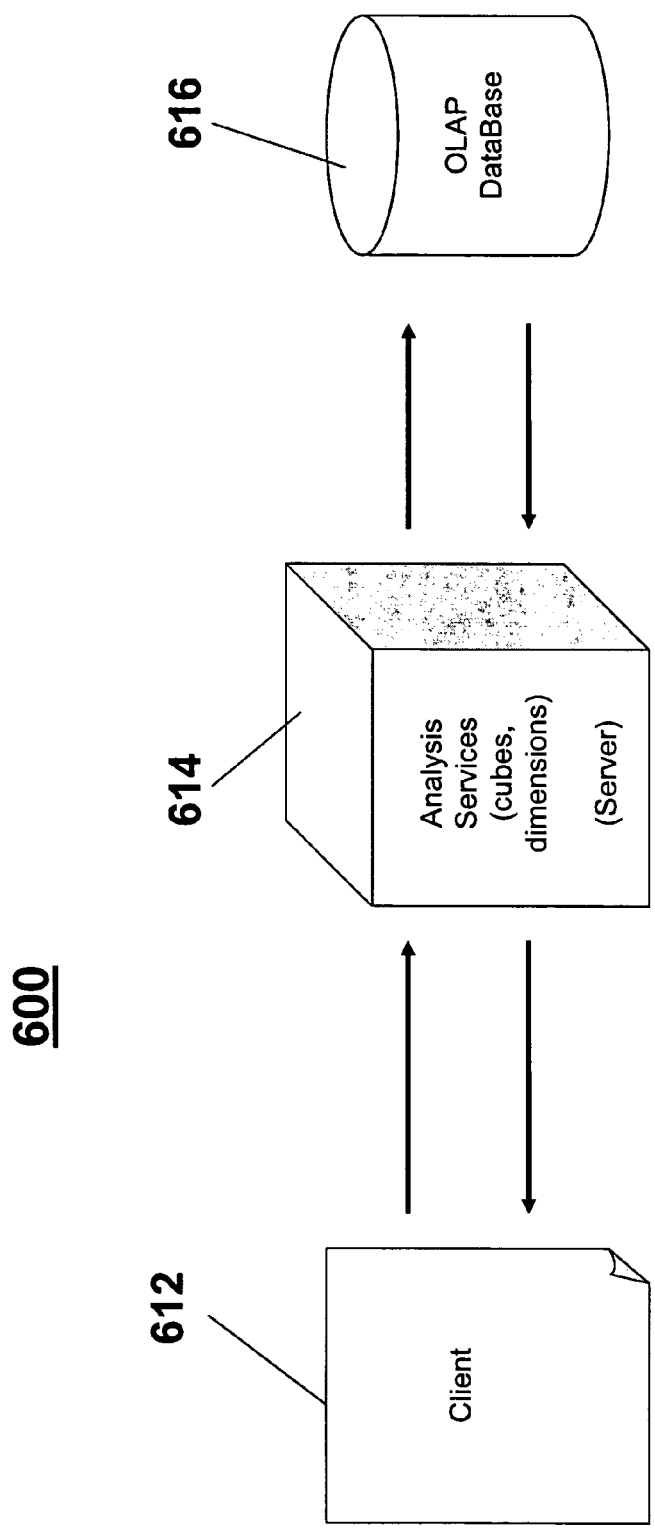
FIG. 6 is a block diagram of an exemplary system used to access a database via a multiple-hierarchy dimension in accordance with an exemplary embodiment of the present invention.

FIG. 6 is a block diagram of an exemplary system 600 used to access a database. The system 600 includes a client processor 612 coupled to a server.processor 614 coupled to a database 616. In an exemplary embodiment, the database 616 is an OLAP database, and is described below as such. The client processor 612 and the server processor 614 may each include, a processor, memory, keyboard, or display, and may be connected locally or remotely to fixed and/or removable data storage devices and/or data communications devices. Each of the processors 612 and 614 also could be connected to other computer systems via the data communications devices. Those skilled in the art will recognize that any combination of the above components, or any number of different components, peripherals, and other devices, may be used with the computers 612 and 614. Those skilled in the art will also recognize that the processors 612 and 614 can be implemented on a single processor, rather than multiple processors networked together.

In one embodiment, the client processor 612 comprises a network interface program for communicating with a network, and a client program executed by the client processor 612. The server processor 614 comprises a network interface program for communicating with a network, and a server program executed by the server processor 614. The server program performs various database operations, including search and retrieval operations, termed queries, insert operations, update operations, and delete operations, against one or more databases 616 stored on a remote or local data storage device.

In one embodiment, the server processor 614 performs the functions related to dimensions, attributes, and hierarchies. These functions include defining a dimension (e.g., dimension 330) comprising a plurality of attributes (e.g., attributes 334, 336, 338, 340, 342, and 344), assigning each attribute to a respective column of the database 616, defining relationships between the attributes, and defining at least one hierarchy (e.g., hierarchies 326 and 328) comprising a sequence of attributes, and accessing the database via the dimension.

OLAP systems and methods using dimension attributes and multiple hierarchies per dimension as described herein may be embodied in the form of computer-implemented processes and system for practicing those processes. OLAP systems and methods using dimension attributes and multiple hierarchies per dimension as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The OLAP systems and methods using dimension attributes and multiple hierarchies per dimension as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the exemplary embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for improving data processing in connection with a database having restrictions therein, said method comprising:
    defining a dimension comprising a plurality of attributes;
    assigning each attribute to a respective column of said database having restrictions therein;
    defining relationships between said attributes of the defined dimension, said defined relationships not being subject to said restrictions of said database, said defined relationships establishing a first hierarchy of the attributes with respect to the defined dimension;
    defining new relationships between said attributes of the defined dimension, said new defined relationships establishing a second hierarchy of the attributes with respect to the defined dimension:
    said new relationships not being subject to said restrictions of the database; and
    said new relationships of the second hierarchy modifying at least one relationship of the first hierarchy between said attributes; and
    accessing said database via a query that employs at least one of the first hierarchy and the second hierarchy of said dimension without modifying the dimension, and displaying a result corresponding to the query to a user,
    wherein the first hierarchy and the second hierarchy share at least one common attribute from the defined dimension, the first hierarchy has at least one attribute from the defined dimension not present in the second hierarchy, and the second hierarchy has at least one attribute from the defined dimension not present in the first hierarchy.

2. A method in accordance with claim 1, wherein each hierarchy defines a drill down path for accessing said database.

3. A method in accordance with claim 1, wherein said act of defining said at least one hierarchy is independent of said database.

4. A method in accordance with claim 1, wherein said database is a relational database.

5. A method in accordance with claim 1, wherein said dimension is utilized with an on line analysis processing (OLAP) system.

6. A computer-readable storage medium having computer-executable instructions for improving data processing in connection with a database having restrictions therein, by performing acts comprising:
    defining a dimension comprising a plurality of attributes;
    assigning each attribute to a respective column of said database having restrictions therein;
    defining relationships between said attributes of the defined dimension, said defined relationships not being subject to said restrictions of said database, said defined relationships establishing a first hierarchy of the attributes with respect to the defined dimension;
    defining new relationships between said attributes of the defined dimension, said new defined relationships establishing a second hierarchy of the attributes with respect to the defined dimension:
    said new relationships not being subject to said restrictions of the database; and
    said new relationships of the second hierarchy modifying at least one relationship of the first hierarchy between said attributes; and
    accessing said database via at least one of the first and second hierarchies of said dimension without modifying the dimension,
    wherein the first hierarchy and the second hierarchy share at least one common attribute from the defined dimension, the first hierarchy has at least one attribute from the defined dimension not present in the second hierarchy, and the second hierarchy has at least one attribute from the defined dimension not present in the first hierarchy.

7. A computer-readable storage medium in accordance with claim 6, wherein each hierarchy defines a drill down path for accessing said database.

8. A computer-readable storage medium in accordance with claim 6, wherein said act of defining said at least one hierarchy is independent of said database.

9. A computer-readable storage medium in accordance with claim 6, wherein said database is a relational database.

10. A computer-readable storage medium in accordance with claim 6, wherein said dimension is utilized with an on line analysis processing (OLAP) system.

11. A computer-readable storage medium in accordance with claim 6 comprising a data structure comprising:
    the dimension comprising the plurality of attributes, wherein each attribute is bound to a column in a database; and
    a logical structure indicative of relationships between said plurality of attributes, wherein said relationships are not subject to said restrictions placed on said database.

12. A computer-readable storage medium in accordance with claim 11, wherein each hierarchy provides a drill down path for accessing said database.

13. A computer-readable storage medium in accordance with claim 11, wherein each sequence is defined independent of said restrictions associated with said database.

14. A computer-readable storage medium in accordance with claim 11, wherein said logical structure is defined independent of said restrictions associated with said database.

15. A computer-readable storage medium in accordance with claim 11, wherein said database is a relational database.

16. A computer-readable storage medium in accordance with claim 11, wherein said database is capable of being utilized with an online analytical processing (OLAP) system.

17. A system for accessing a database having restrictions therein, said system comprising:
    a processor coupled to a storage device, said storage device comprising said database;

a first definition component for defining a dimension comprising a plurality of attributes;

an assignment component for assigning each attribute to a respective column of said database;

defining relationships between said attributes of the defined dimension, said defined relationships not being subject to said restrictions of said database, said defined relationships establishing a first hierarchy of the attributes with respect to the defined dimension, said second component defining new relationships between said attributes of the defined dimension, said new defined relationships establishing a second hierarchy of the attributes with respect to the defined dimension:

said new relationships not being subject to said restrictions of the database; and said new relationships of the second hierarchy modifying at least one relationship of the first hierarchy between said attributes; and an access component for allowing access to said database via at least one of the first and second hierarchies of said dimension without modifying the dimension, wherein the first hierarchy and the second hierarchy share at least one common attribute from the defined dimension, the first hierarchy has at least one attribute from the defined dimension not present in the second hierarchy, and the second hierarchy has at least one attribute from the defined dimension not present in the first hierarchy.

18. A system in accordance with claim 17, wherein each hierarchy defines a drill down path for said access component.

19. A system in accordance with claim 17, wherein said third definition component defines said at least one hierarchy independent of said database.

20. A system in accordance with claim 17, wherein said system is utilized with an on line analysis processing (OLAP) system.

21. A system embodied in computer hardware, the system for accessing a database having restrictions therein, said system comprising:

means for defining a dimension comprising a plurality of attributes;

means for assigning each attribute to a respective column of said database having restrictions therein;

means for defining relationships between said attributes of the defined dimension, wherein said defined relationships are not subject to said restrictions of said database, said defined relationships establishing a first hierarchy of the attributes with respect to the defined dimension;

means for defining new relationships between said attributes of the defined dimension, said new defined relationships establishing a second hierarchy of the attributes with respect to the defined dimension, wherein:

said new relationships are not subject to said restrictions of the database; and said new relationships of the second hierarchy modify at least one relationship of the first hierarchy between said attributes; and;

means for accessing said database via at least one of the first hierarchy and the second hierarchy of said dimension without modifying the dimension, wherein the first hierarchy and the second hierarchy share at least one common attribute from the defined dimension, the first hierarchy has at least one attribute from the defined dimension not present in the second hierarchy, and the second hierarchy has at least one attribute from the defined dimension not present in the first hierarchy.

22. A system in accordance with claim 21, wherein at least one of the first hierarchy and the second hierarchy is defined independent of said database.

23. A system in accordance with claim 21, wherein said system is an on line analysis processing (OLAP) system.

24. A system in accordance with claim 21, wherein said means for defining a dimension, means for assigning, means for defining relationships, means for accessing and means for defining at least one hierarchy comprise at least one application programming interface (API).

25. A method for retrieving data from a database having restrictions therein, said method comprising:

receiving a data retrieval request including a dimension, wherein:

said dimension includes a plurality of attributes;

each attribute is assigned to a respective column of said database;

at least one relationship between said attributes of the defined dimension is defined;

said at least one defined relationship not being subject to said restrictions of said database, said defined relationships establishing a first hierarchy of the attributes with respect to the defined dimension;

new relationships are defined between said attributes of the defined dimension, said new defined relationships establishing a second hierarchy of the attributes with respect to the defined dimension;

said new relationships not being subject to said restrictions of the database; and said new relationships of the second hierarchy modifying at least one relationship of the first hierarchy between said attributes; and retrieving said data from said database via a query that employs at least one of the first and second hierarchies of said dimension without modifying the dimension, and displaying a result corresponding to the query_to a user, wherein the first hierarchy and the second hierarchy share at least one common attribute from the defined dimension, the first hierarchy has at least one attribute from the defined dimension not present in the second hierarchy, and the second hierarchy has at least one attribute from the defined dimension not present in the first hierarchy.

26. A method in accordance with claim 25, further comprising: providing said retrieved data in response to said data retrieval request.

27. A method in accordance with claim 25, wherein each hierarchy provides a drill down path for accessing said database.

28. A method in accordance with claim 25, wherein each sequence is defined independent of said restrictions associated with said database.

29. A method in accordance with claim 25, wherein said relationships between said attributes are defined independent of said restrictions associated with said database.

30. A method in accordance with claim 25, wherein said database is a relational database.

31. A method in accordance with claim 25, wherein said database is capable of being utilized with an online analytical processing (OLAP) system.

* * * * *